(12) United States Patent
Holtzberg

(10) Patent No.: US 7,564,956 B2
(45) Date of Patent: Jul. 21, 2009

(54) METHOD, SYSTEM AND ARTICLE OF MANUFACTURE FOR BOOKMARKING VOICEMAIL MESSAGES

(75) Inventor: Laurie Ann Holtzberg, Cupertino, CA (US)

(73) Assignee: Southwestern Bell Communications Services, Inc., Pleasanton, CA (US)

( * ) Notice: Subject to any disclaimer, the term of this patent is extended or adjusted under 35 U.S.C. 154(b) by 12 days.

(21) Appl. No.: 11/773,291

(22) Filed: Jul. 3, 2007

(65) Prior Publication Data

US 2008/0013698 A1    Jan. 17, 2008

Related U.S. Application Data

(63) Continuation of application No. 10/626,462, filed on Jul. 23, 2003, now Pat. No. 7,272,213, which is a continuation of application No. 09/741,927, filed on Dec. 20, 2000, now Pat. No. 6,625,261.

(51) Int. Cl.
*H04M 1/64* (2006.01)

(52) U.S. Cl. ............................ 379/88.25; 379/88.18

(58) Field of Classification Search ............ 379/88.22, 379/88.15, 88.18, 88.23, 88.25
See application file for complete search history.

(56) References Cited

U.S. PATENT DOCUMENTS

| | | | | |
|---|---|---|---|---|
| 4,602,129 A | * | 7/1986 | Matthews et al. | ........ 379/88.26 |
| 5,031,218 A | | 7/1991 | Galand et al. | |
| 5,153,579 A | * | 10/1992 | Fisch et al. | ............ 340/825.22 |
| 5,388,151 A | | 2/1995 | Khalid et al. | |
| 5,526,407 A | | 6/1996 | Russell et al. | |
| 5,568,540 A | | 10/1996 | Greco et al. | |
| 5,664,060 A | | 9/1997 | Jarrett et al. | |
| 5,668,863 A | | 9/1997 | Bieselin et al. | |
| 5,732,216 A | | 3/1998 | Logan et al. | |
| 5,751,794 A | | 5/1998 | Kugell et al. | |

(Continued)

FOREIGN PATENT DOCUMENTS

EP    1102461 A2    5/2001

(Continued)

OTHER PUBLICATIONS

"Unified messaging, fax server-Captarais CallXpress product release history" [online]. Captaris, 1998 [retrieved on Feb. 12, 2002]. Retrieved from the Internet: URL:http://www.captarais.com/ctg/solutions_and_products/latest_product_releases/products-cx.html.

(Continued)

*Primary Examiner*—Simon Sing
(74) *Attorney, Agent, or Firm*—Brinks Hofer Gilson & Lione

(57) ABSTRACT

A voicemail system includes a voicemail bookmarking procedure that permits users to bookmark voicemail messages during message playback. Upon receiving a bookmark request from a user, the procedure generates a bookmark pointer defining a starting point for subsequent playback of the message. The bookmark pointer can be based, in part, on a timing offset entered by the user while making the bookmark request. The timing offset value defines a user-selected playback starting point that occurs before the message time at which the bookmark request was made. The value of the timing offset can be user selected.

9 Claims, 4 Drawing Sheets

U.S. PATENT DOCUMENTS

| | | |
|---|---|---|
| 5,842,170 A | 11/1998 | Daberko et al. |
| 5,922,045 A | 7/1999 | Hanson |
| 5,926,789 A | 7/1999 | Barbara et al. |
| 6,055,495 A | 4/2000 | Tucker et al. |
| 6,076,052 A | 6/2000 | Bannai et al. |
| 6,104,803 A | 8/2000 | Weser et al. |
| 6,526,128 B1 * | 2/2003 | Kermani .................. 379/88.22 |
| 6,625,261 B2 | 9/2003 | Holtzberg |
| 6,876,729 B1 * | 4/2005 | Kuter et al. .............. 379/88.22 |
| 6,993,120 B2 * | 1/2006 | Brown et al. ............. 379/88.13 |
| 7,092,496 B1 * | 8/2006 | Maes et al. .............. 379/88.01 |

FOREIGN PATENT DOCUMENTS

| | | |
|---|---|---|
| JP | 2001-216334 | 8/2001 |

OTHER PUBLICATIONS

CallXpress for Windows NT® User's Guide Version 5.03 Applied Voice Technology, 1998.

* cited by examiner

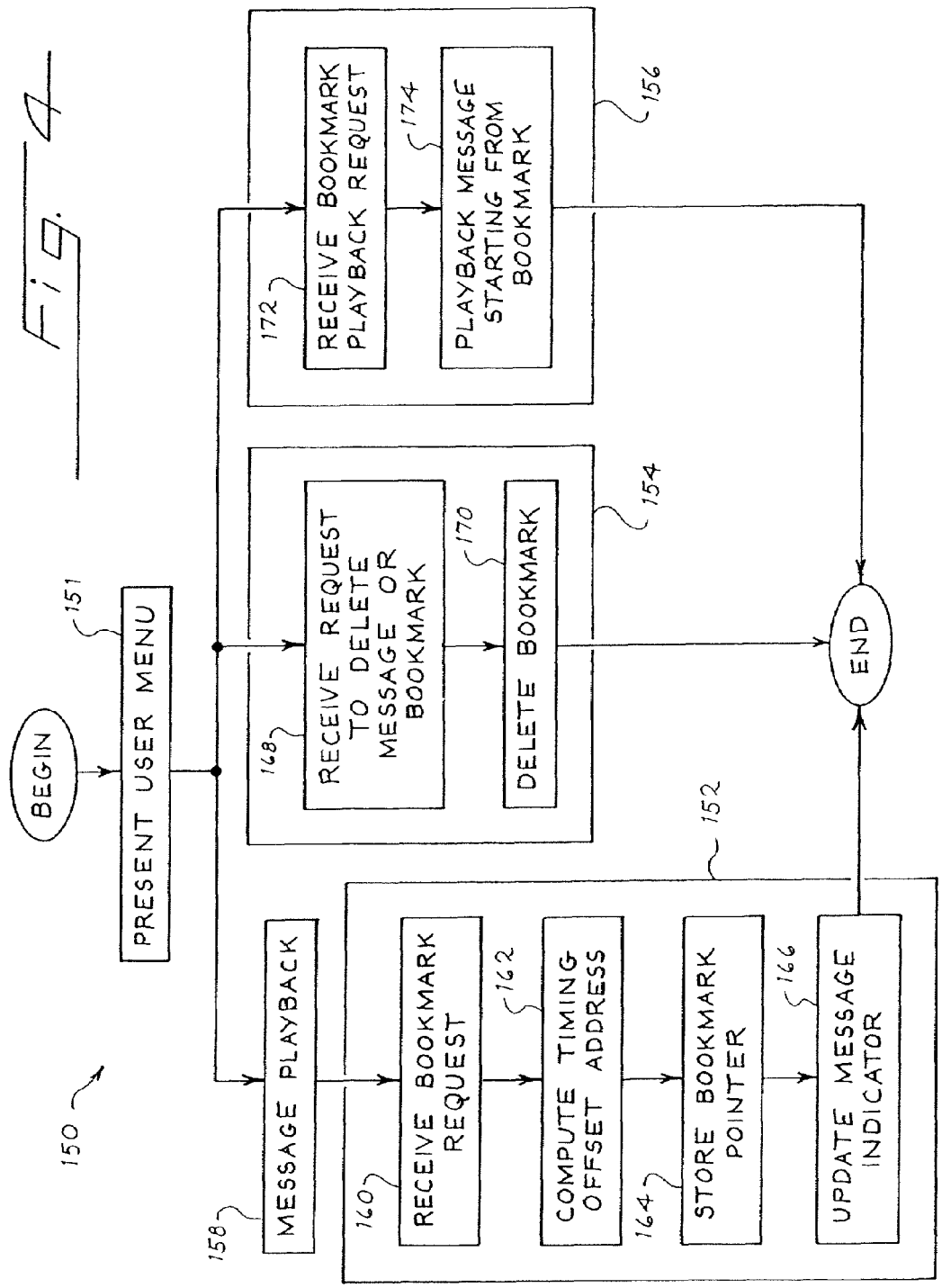

METHOD, SYSTEM AND ARTICLE OF MANUFACTURE FOR BOOKMARKING VOICEMAIL MESSAGES

This application is a continuation of U.S. patent application Ser. No. 10/626,462, filed on Jul. 23, 2003, now U.S. Pat. No. 7,272,213, which is a continuation of U.S. patent application Ser. No. 09/741,927, filed on Dec. 20, 2000, now U.S. Pat. No. 6,625,261; the contents of which are hereby incorporated in their entirety herein for all purpose.

TECHNICAL FIELD OF THE INVENTION

The present invention generally relates to audio recording devices, and in particular, to voicemail systems.

BACKGROUND OF THE INVENTION

Voicemail systems allow telephone callers to leave recorded messages for called parties when the called parties are unavailable. Most voicemail systems record messages if the called party's phone line is either in use or does not answer. In either case, the voicemail system answers the phone call and records the message. Typically, the message is digitized and stored on a computer hard disk for later playback by the called party.

To play recorded messages, a mailbox owner calls the voicemail system and accesses stored voice messages using a sequence of touchtone or voice commands. In response to these commands, the voicemail system can perform various functions with respect to message playback. For example, a mailbox owner can fast forward, rewind, delete or skip a message during playback. In some voicemail systems, during a message playback, the listener can fast forward or rewind either to the end of the message or a specific amount of time. Using these voicemail systems to play back specific middle portions of messages, it is frequently the case that listeners must repeatedly enter fast-forward commands to get the systems to skip ahead to the desired places in the messages.

Although the playback functions of currently-available voicemail systems are adequate in many situations, there is room for improvement. For instance, some users may find it inconvenient and time consuming to select specific portions of messages for playback using conventional fast forward and rewind functions available with some voicemail systems.

Accordingly, there is a need for an improved voicemail system that permits users to conveniently select portions of stored messages for playback.

BRIEF DESCRIPTION OF THE DRAWINGS

FIG. 4 is a flow chart illustrating the operation of the voicemail system shown in FIG. 2.

DETAILED DESCRIPTION OF THE PRESENTLY PREFERRED EMBODIMENT(S)

It is an advantage of the present invention to provide a voicemail system that permits users to bookmark messages during message playback. Bookmarks can be set by entering appropriate touch-tone or voice commands. A bookmark defines a starting point within the message at which subsequent playbacks of the message can begin. The ability to bookmark messages significantly improves the convenience of playing back specific portions of stored voicemail messages.

Figure 1:
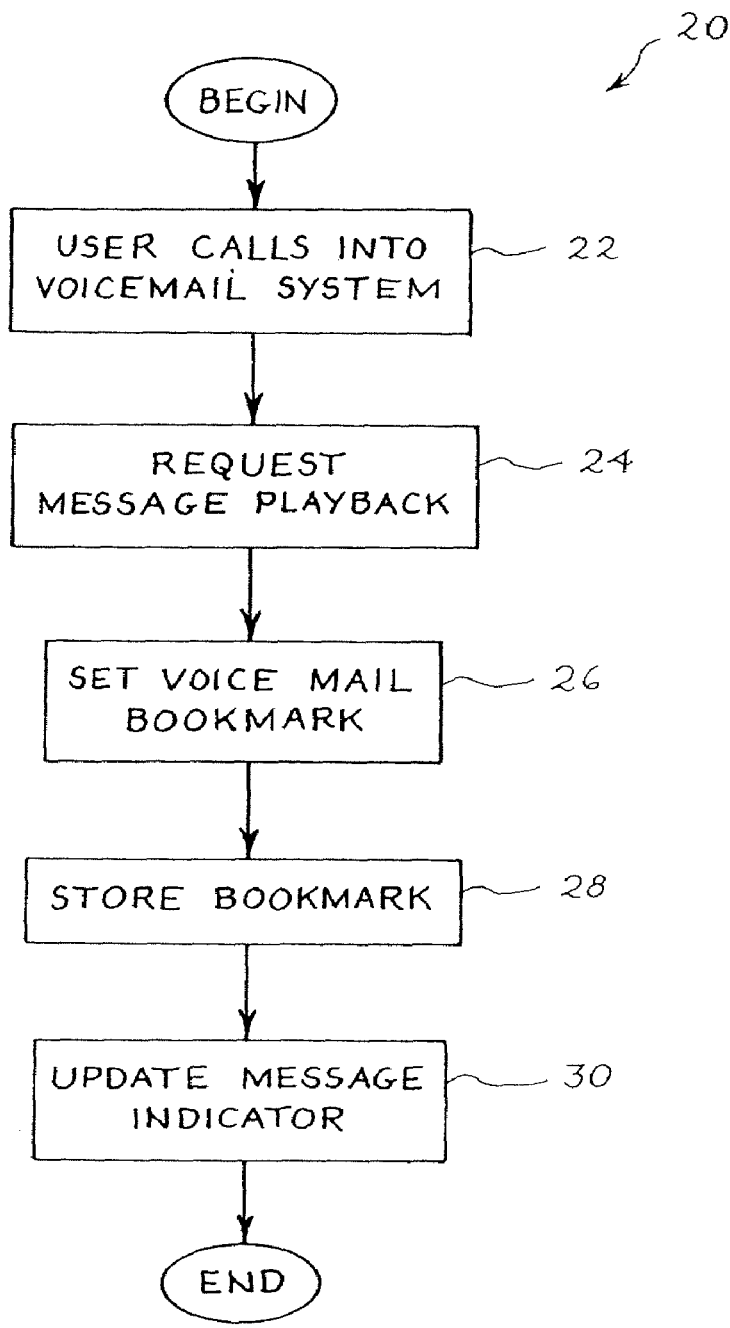
FIG. 1 is a flow chart of a method of setting a voicemail bookmark in accordance with an embodiment of the present invention.

Turning now to the drawings, and in particular to FIG. 1, there is illustrated a flow chart 20 illustrating a method of setting a voicemail bookmark in accordance with an embodiment of the present invention. In step 22, a user calls into a voicemail system. After connecting to the voicemail system, the user enters information conventionally associated with accessing a voicemail box such as a user ID and/or password. Provided that there are voicemail messages stored for the user, the user requests message playback (step 24). During playback of the message, the user can enter a command to set a voicemail bookmark (step 26). The command can be entered using one or more touch-tone digits or voice commands at the user's telephone. The voicemail system responds to this command by setting a bookmark pointer corresponding to the message being played back.

According to one aspect of the invention, one of the digits entered can specify a timing offset that causes the playback starting point to be set at a specified period of time before the point in the message at which the bookmark request is made. This permits a "warm-up" period to be added to the bookmarked voicemail message.

In step 28, the bookmark pointer is stored by the voicemail system so that the user can subsequently access the message at the place indicated by the bookmark. The bookmark pointer can specify a computer memory location associated with a file containing the content of the stored voicemail message. In addition, the bookmark pointer can be based, in part, on the timing offset entered by the user.

In step 30, a voice message indicator generated by the voicemail system is updated to indicate that the bookmarked message is no longer a new message, and has been bookmarked by the user. The voicemail system can be configured to cause the message indicator to be displayed at the user's terminal unit using a standard protocol and display interface.

Figure 2:
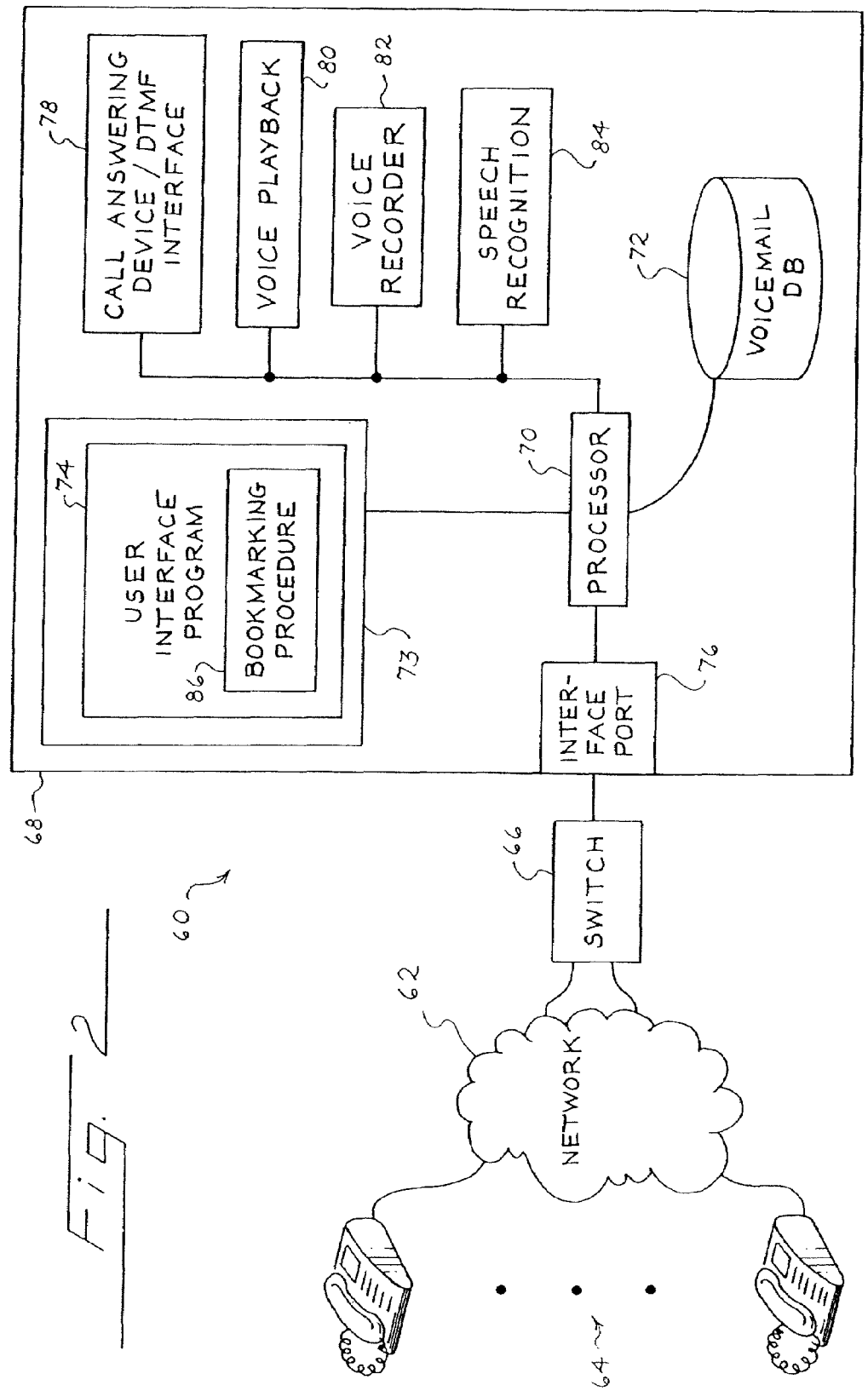
FIG. 2 is a block diagram of a telecommunication system in accordance with another embodiment of the present invention.

FIG. 2 is a block diagram of a telecommunication system 60 in accordance with another embodiment of the present invention. The telecommunication system 60 includes a plurality of terminal units 64, a telecommunication switch 66, and a voicemail system 68. The terminal units 64 can be any suitable end-user device, such as a telephone, cellular phone, or the like, for permitting voice communication over a commercially-available telecommunications network 62. The switch 66 can be any suitable commercially-available telecommunication switch, located at a private branch exchange (PBX) or central office, for allowing the terminal units 64 to access the voicemail services of the voicemail system 68.

The voicemail system 68 can be a voicemail server communicating with the switch 66 over a standard interface. The voicemail system 68 includes a processor 70, voicemail database (DB) 72, a memory 73, and interface port 76, a call answering device/dual-tone of multi frequency (DTMF) interface 78, a voice playback subsystem 80, a voice recorder 82, and a speech recognition subsystem 84. A memory 73 can store a user interface program 74 that is executable by the processor 70. The user interface program 74 includes a bookmarking procedure 86 that permits the voicemail system 68 to provide the voicemail bookmarking feature.

The voicemail system 68 can be implemented using a Compact Service Node, available from Lucent Technologies, Inc., configured and programmed to perform the functions disclosed herein. The switch 66 can be an advanced intelligent network (AIN) compatible switch, such as the 5ESS switch, also available from Lucent Technologies, Inc.

Figure 3:
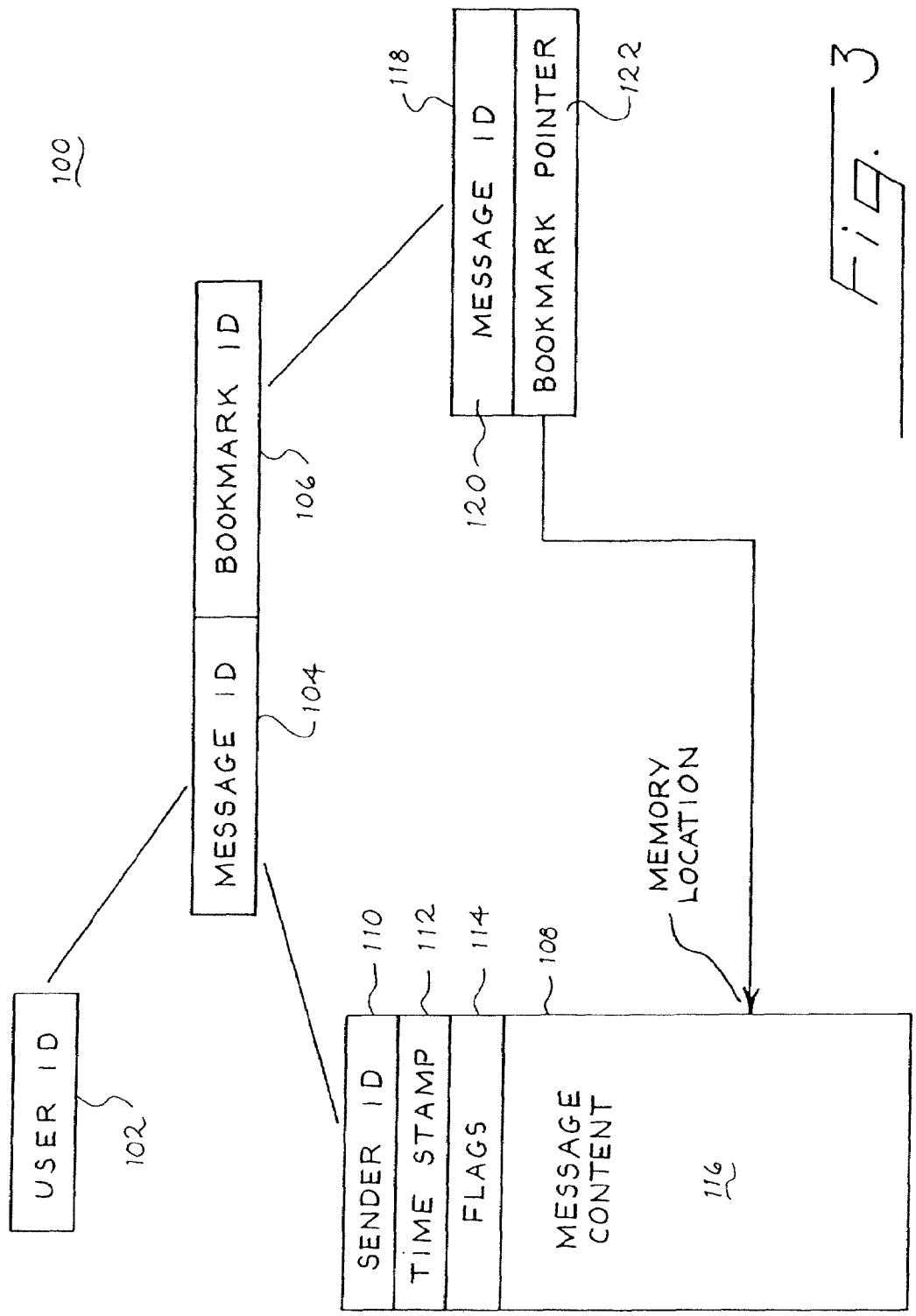
FIG. 3 is a conceptual diagram illustrating an exemplary data structure associated with a voice mailbox provided by the voicemail system of FIG. 2.

FIG. 3 illustrates a data structure 100 of an exemplary voice mailbox stored in the voicemail DB 72. Each voice mailbox in the database 72 has associated with it a user ID 102. Associated with each user ID 102, is one or more message IDs 104 for identifying voicemail messages stored in the DB 72 for the user. Also associated with each user ID 102 is one or more bookmark IDs 106 for identifying voicemail bookmarks associated with the owner of the voicemail box.

For each message ID 104, the DB 72 stores an associated voice message record 108. The voice message record 108 can contain a sender ID 110 identifying the caller leaving the message, a time stamp 112 indicating the time at which the message was recorded and one or more system flags 114 for configuring system parameters and functions relating to the message. The message record 108 also includes the message content 116, which can include the recorded voice message digitized into a format suitable for storage in the DB 72 and for playback by the voice playback subsystem 80. The message content 116 can be compressed and/or encrypted using standard speech processing algorithms.

The bookmark ID 106 has associated with it a bookmark record 118 containing a message ID 120 and a bookmark pointer 122. The message ID 120 identifies the bookmarked message. The bookmark pointer 122 can be a specific memory location indicating a playback starting point in the message content 116 at which the stored message is played back when the user subsequently selects the bookmark playback feature.

FIG. 4 is a flow chart 150 illustrating the operation of the voicemail system 68. In step 151, the voicemail system 68 generates an audio user selection menu for a user that has called in. The menu can be generated by the user interface program 74, executing on the processor 70 to generate a synthesized interactive voice response interface using the voice playback subsystem 80. The menu can provide selections conventionally associated with voicemail systems, as well as selections related to voicemail bookmarking, such as play back or deletion of bookmarked voicemail messages.

In step 158, a user selects the message playback option from the menu. This causes the voicemail system to begin the playback of stored messages. During message playback, the user can enter a command that starts the bookmark set subroutine 152. In this subroutine, the system 68 receives a bookmark request from the user (step 160). The bookmark request can be a predefined sequence of one or more touch-tone entries. Alternatively, the bookmark request can be a voiced command by the user and processed by the speech recognition subsystem 84. The bookmark request causes the voicemail system 68 to record a memory address identifying the current location in the stored voice message being played back.

The bookmark request can include a timing offset value that defines a warm up period immediately preceding the point in time of the message playback at which the bookmark is requested. The timing offset causes the bookmarked message to be played back starting from the beginning of the warm up period. The timing offset can be entered as a touch-tone signal defining a period in seconds. For example, immediately after entering the touch-tone command for the bookmark request, a user could push the digit "7" to indicate a timing offset of seven seconds, so that upon subsequent playback of the bookmarked message, the playback will begin seven seconds before the point at which the bookmark request occurred in the message. Likewise, other digits could be pushed to enter other timing offset values, e.g., "1" for a one second offset, "2" for a two second offset, and so on.

In step 162, a memory address corresponding to the timing offset value is computed by the voicemail system 68. This can be accomplished by determining the number of bytes required to represent a unit time of recorded voice. The bytes per second value can then be multiplied by the timing offset value entered by the user to convert the user-entered offset value to a corresponding memory address offset value. This address offset value can then be combined with the memory address corresponding to the request to generate the bookmark pointer.

The bookmark pointer is then stored in the bookmark record (step 164). In step 166, a user message indicator generated by the voicemail system 68 is updated to indicate that the bookmarked message is no longer a new message. The message indicator can be a visual indication, such as text, displayable on a user terminal unit.

Other bookmark-related subroutines, specifically the bookmark delete and playback subroutines 154-156, can be initiated by the user through the menu. Concerning the delete subroutine 154, if upon presenting the user menu, the voicemail system 68 receives a request to delete a stored voice message or bookmark (step 168), the delete bookmark subroutine 154 is initiated. The delete request can be entered by a user using a touch-tone or a voice command, and can specify one or more bookmarks or messages to be deleted. Upon receiving the delete message command, any bookmarks corresponding to the deleted message are likewise deleted (step 170) from the DB 72. Similarly, upon receiving a delete bookmark command, the corresponding bookmark is deleted.

The bookmarked-message playback subroutine 156 allows the voicemail system 68 to play back bookmarked voicemail messages stored in the DB 72. In step 172, the voicemail system 68 receives a bookmark playback request. The bookmark playback request can be either a touch-tone or voice command entered by the user to select a previously bookmarked message for playback. The request can specify a particular bookmark ID. Upon receiving the bookmark playback request, the voicemail system 68 retrieves the bookmarked message from the voicemail DB 72 and plays back the message starting from the position indicated by the bookmark pointer. To playback the stored message, the message content is provided to the voice playback subsystem 80, which generates an audio representation of the messages to the user terminal.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method for bookmarking a voicemail message, the method comprising:

playing a stored voicemail message in response to a playback request;

receiving a bookmark request during the play of the voicemail message, wherein the bookmark request indicates a playback starting point within the voicemail message;

defining a bookmark in response to the bookmark request, wherein the bookmark request includes a timing offset value that defines a second playback starting point that precedes the playback starting point;

receiving a request to play the voicemail message from the playback starting point represented by the bookmark; and playing the voicemail message from the second playback starting point that precedes the playback starting point represented by the bookmark.

2. The method of claim 1, wherein playing the voicemail message from the second playback starting point occurs without receiving a rewind command from a user.

3. The method of claim 1, wherein the voicemail message is stored in a database, and wherein the method further comprises determining a memory location within the stored voicemail message based on the timing offset value.

4. A telecommunication system comprising:
   a switch; and
   a processor in communication with the switch and operative to:
      play a stored voicemail message in response to a playback request;
      receive a bookmark request during the play of the voicemail message, wherein the bookmark request indicates a playback starting point within the voicemail message;
      define a bookmark in response to the bookmark request, wherein the bookmark request includes a timing offset value that defines a second playback starting point that precedes the playback starting point;
      receive a request to play the voicemail message from the playback starting point represented by the bookmark; and
      play the voicemail message from the second playback starting point that precedes the playback starting point represented by the bookmark.

5. The telecommunication system of claim 4, wherein the processor is further operative to:
   play the voicemail message starting at the second playback starting period without receiving a rewind command.

6. The telecommunication system of claim 4 further comprising
   a voicemail database configured to store the voicemail message, wherein the voicemail database is in communication with the processor.

7. A method for bookmarking a voicemail message, the method comprising:
   playing a stored voicemail message in response to a playback request;
   receiving a bookmark request during the play of the voicemail message, wherein the bookmark request indicates a playback starting point within the voicemail message; and
   defining a bookmark in response to the bookmark request, wherein the bookmark request includes a timing offset value that defines a second playback starting point that precedes the playback starting point.

8. The method of claim 7 further comprising
   receiving a request to play the voicemail message from the playback starting point represented by the bookmark; and
   playing the voicemail message from the second playback starting point that precedes the playback starting point represented by the bookmark.

9. The method of claim 7, wherein the voicemail message is stored in a database, and wherein the method further comprises determining a memory location within the stored voicemail message based on the timing offset value.

\* \* \* \* \*